United States Patent
Leinonen et al.

(10) Patent No.: US 7,525,481 B2
(45) Date of Patent: Apr. 28, 2009

(54) PERFORMANCE OF A RECEIVER IN INTERFERING CONDITIONS

(75) Inventors: Marko Leinonen, Oulu (FI); Seppo Rousu, Oulu (FI)

(73) Assignee: Nokia Corporation, Espoo (FI)

( * ) Notice: Subject to any disclaimer, the term of this patent is extended or adjusted under 35 U.S.C. 154(b) by 27 days.

(21) Appl. No.: 10/559,918

(22) PCT Filed: Jun. 10, 2003

(86) PCT No.: PCT/IB03/02174
§ 371 (c)(1),
(2), (4) Date: Dec. 7, 2005

(87) PCT Pub. No.: WO2004/109942
PCT Pub. Date: Dec. 16, 2004

(65) Prior Publication Data
US 2006/0152408 A1    Jul. 13, 2006

(51) Int. Cl.
*G01S 1/00* (2006.01)
*H04B 1/10* (2006.01)

(52) U.S. Cl. .................. 342/357.12; 342/357.09; 455/302

(58) Field of Classification Search ...... 342/357.01–17, 342/357.12, 357.09; 455/302
See application file for complete search history.

(56) References Cited

U.S. PATENT DOCUMENTS

| | | | |
|---|---|---|---|
| 5,678,169 A * | 10/1997 | Turney | 455/1 |
| 6,107,960 A * | 8/2000 | Krasner | 342/357.09 |
| 6,675,003 B1 * | 1/2004 | Dubash et al. | 455/302 |
| 6,681,181 B2 * | 1/2004 | Fielder | 701/213 |
| 6,784,830 B1 * | 8/2004 | Lawrence et al. | 342/357.12 |
| 6,836,645 B2 | 12/2004 | Hilgers et al. | |
| 6,961,019 B1 * | 11/2005 | McConnell et al. | 342/357.1 |
| 2002/0081987 A1 * | 6/2002 | Yoshida et al. | 455/277.1 |
| 2002/0136180 A1 * | 9/2002 | Asokan | 370/337 |
| 2002/0173909 A1 * | 11/2002 | Verbil | 701/213 |

(Continued)

FOREIGN PATENT DOCUMENTS

CN    1405576 A    3/2003

(Continued)

OTHER PUBLICATIONS

"A Dual-L Antenna With a Novel Tuning Technique for Dual Frequency Applications", Chen et al., IEEE Transactions on Antennas and Propagation, vol. 50, No. 3, Mar. 2002, pp. 402-403.

(Continued)

*Primary Examiner*—Thomas H Tarcza
*Assistant Examiner*—Harry Liu (57) ABSTRACT

A device 20 includes a receiver 21 for receiving and processing signals at least in a first frequency band and an antenna 216 which is connected to the receiver 21. In order to improve the performance of such a receiver, the device 20 in addition includes a tuning component 217 for shifting a frequency response of the antenna 216 from the first frequency band to a second frequency band. Further, the device 20 includes a controlling portion 221 causing the tuning component 217 to shift the frequency response of the antenna 216 from the first frequency band to the second frequency band, in case a wideband noise is expected in the first frequency band. A corresponding method is shown as well.

22 Claims, 8 Drawing Sheets

U.S. PATENT DOCUMENTS

2003/0055562 A1\* 3/2003 Levy et al. .................. 701/214
2003/0114188 A1 6/2003 Rousu ........................ 455/553
2004/0239559 A1\* 12/2004 King et al. ............. 342/357.12

FOREIGN PATENT DOCUMENTS

| EP | 0336418 | 10/1989 |
|---|---|---|
| EP | 1079533 | 2/2001 |
| EP | 1253720 | 10/2002 |

OTHER PUBLICATIONS

"Galileo", The European Programme for Global Navigation Services, ESA Publications Division, ESTEC, The Netherlands, May 2002.

\* cited by examiner

PERFORMANCE OF A RECEIVER IN INTERFERING CONDITIONS

CROSS-REFERENCE TO RELATED APPLICATION

This application is the U.S. National Stage of International Application Number PCT/IB2003/002174 filed 10 Jun. 2003 and published in English 15 Dec. 2004 under International Publication Number WO 2004/109942 A1 with International Search Report.

FIELD OF THE INVENTION

The invention relates to a device comprising a receiver for receiving and processing signals and an antenna which is connected to the receiver. The invention relates equally to a method for improving the performance of such a receiver.

BACKGROUND OF THE INVENTION

Receivers for receiving and processing signals are well known in the art, for example in the form of a GPS (Global Positioning System) receiver of a GPS system.

The performance of a receiver may be degraded during time intervals in which wideband noise in the frequency band used for the signals which are to be received by the receiver is present in the environment of the device, since this wideband noise may reduce the signal-to-noise ratio (SNR) of the received signals significantly.

The wideband noise can be generated in particular by a communication system transmitter integrated in the same device as the receiver, or by a nearby communication system transmitter external to this device. Such an internal or external communication system transmitter can be for instance part of a GSM (Global System for Mobile communications) transceiver, of a CDMA (Code Division Multiple Access) transceiver, of a US-TDMA transceiver or of a WCDMA (Wideband CDMA) transceiver.

In a GPS system, for example, several GPS satellites that orbit the earth transmit signals which are received and evaluated by GPS receivers. All GPS satellites use the same two carrier frequencies L1 and L2 of 1575.42 MHz and 1227.60 MHz, respectively. GPS signaling is based on a CDMA principle, i.e. the satellites and their signals are separated by the codes used to modulate the two carrier signals. The employed carrier modulation is a BPSK (bi-phase shift key) modulation, in which the carrier frequency phase is shifted by 180 degrees every time a chip changes from zero to one or vice versa.

Figure 1:
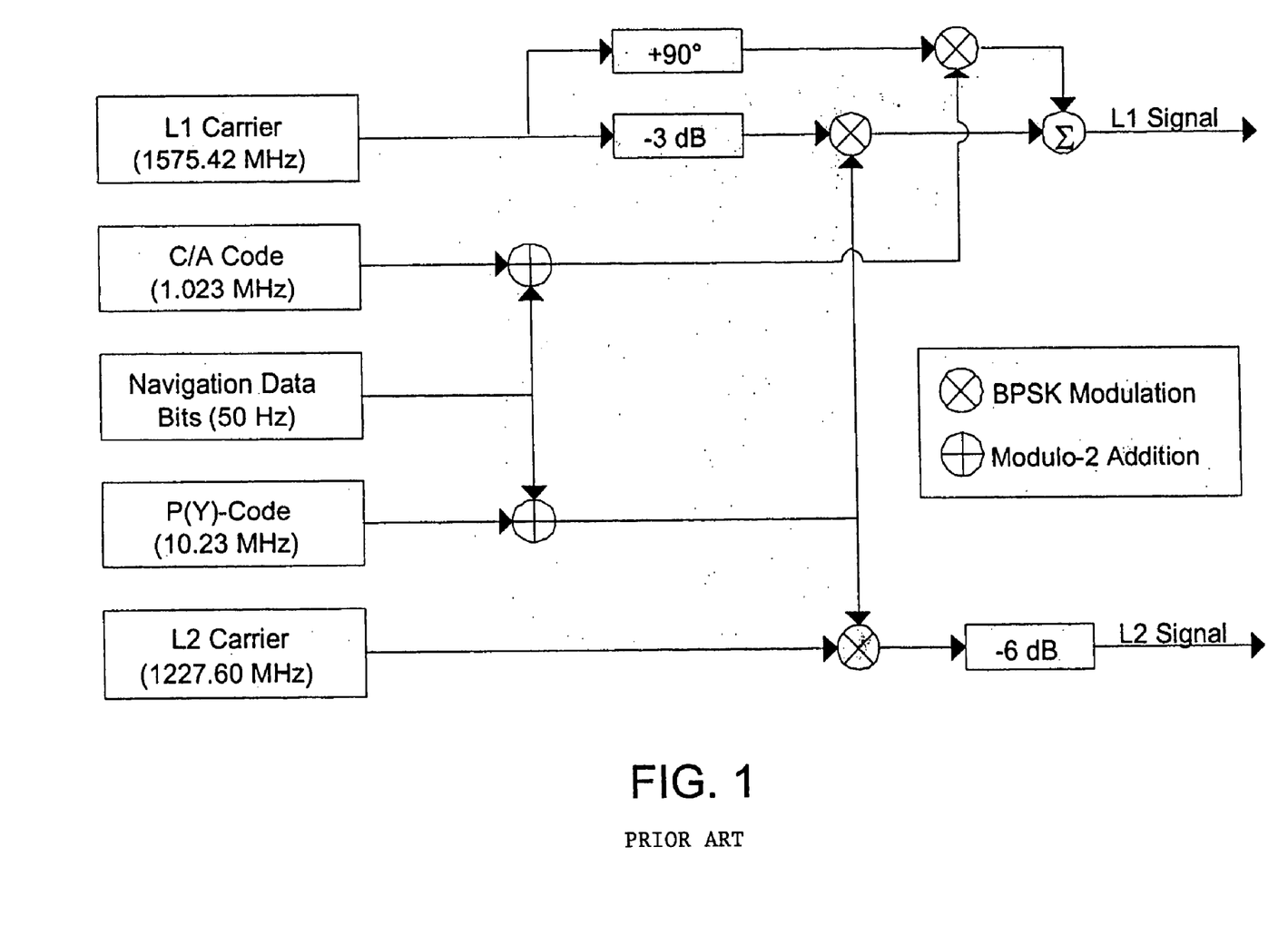
FIG. 1 illustrates the modulation of GPS carrier frequencies.

The modulation of the carrier frequencies L1 and L2 is illustrated in FIG. 1. After a phase shift of 90 degrees, the sinusoidal L1 carrier signal is BPSK modulated by each satellite with a different C/A (Coarse Acquisition) code known at the receivers. Thus, different channels are obtained for the transmission by the different satellites. The C/A code, which is spreading the spectrum over a 1.023 MHz bandwidth, is a pseudorandom noise sequence which is repeated every 1023 chips, the epoch of the code being 1 ms. The term chips is used to distinguish the bits of a modulation code from data bits.

In parallel, the L1 carrier signal is BPSK modulated after an attenuation by 3 dB with a P-code (Precision code), and the L2 carrier signal is BPSK modulated with the same P-code before an attenuation by 6 dB. Before transmission, the two differently modulated parts of the L1 carrier signal are summed again. The L2 carrier signal carries currently only the P-code. The P-code is much longer than the C/A code. Its chip rate is 10.23 MHz and it repeats every 7 days. In addition, the P-code is currently encrypted, and for that reason it is often referred to as P(Y)-code. Decrypting keys needed for using the P(Y)-code are classified and civil users cannot access them. Therefore, only the L1 carrier C/A code is usable in civil GPS receivers.

Before the C/A code and P(Y)-code are modulated onto the L1 signal and the L2 signal, navigation data bits are added to the C/A and P(Y)-codes by using a modulo-2 addition with a bit rate of 50 bits/s. The navigation information, which constitutes a data sequence, can be evaluated for example for determining the position of the respective receiver. The navigation information comprises e.g. precise satellite orbital parameters and clock correction parameters. When a receiver is able to despread a received signal based on the correct modulation code, it can extract and evaluate the navigation data. A GPS signal which is received at a GPS receiver is further modulated due to the Doppler effect and possibly due other higher order dynamic stresses.

The reception bandwidth of a GPS receiver receiving the modulated satellite signals is related to the reception code. For example, if GPS is based on the L1 carrier C/A code, then the signal requires a frequency band of 1575.42 MHz +/−5 MHz. If a P-code capable receiver is used, then the reception band of the GPS receiver is much wider, it is likely to be 1575.42 MHz +/−24 MHz. The actual used GPS reception bandwidth is further related to the actual implementation, and thus the previously mentioned bandwidths are presented for demonstration purposes. The mentioned GPS bandwidth will thus be used in the following only by way of example.

The GPS standard is currently under modernization. One of the main components of the modernization consists in two new navigation signals that will be available for civil use in addition to the existing civilian service broadcast of the L1-C/A code at 1575.42 MHz.

The first one of these new signals will be a C/A code located at 1227.60 MHz, i.e. modulated onto the L2 carrier frequency, and will be available for general use in non-safety critical applications. The new civilian signal at L2, referred to as "L2CS", will generally be characterized by a 1.023 Mcps (mega chips per second) effective ranging code having a Time Division Multiplex of two ½ rate codes. The L2CS signal will be BPSK modulated onto the L2 carrier, along with the P(Y)-code. This C/A code will be available beginning with the initial GPS Block IIF satellite scheduled for launch in 2003.

The second one of the new signals will be using a third carrier frequency L5 located at 1176.45 MHz. The L5 carrier frequency will be modulated with C/A codes, more specifically with a CL code of 767,250 chips and a CM code of 10,230 chips. The L5 signal will provide a 10.23 Mcps ranging code, wherein it is expected that improved cross correlation properties will be realized. The L5 signal will be message based. It will include an I (In-phase) channel carrying 10-symbol Neumann/Hoffman encoding and a Q (Quadrature) channel carrying 20-symbol Neumann/Hoffman encoding. The I and Q channels will be orthogonally modulated onto the L5 carrier. The L5 signal falls into a frequency band which is protected worldwide for aeronautical radionavigation, and therefore it will be protected for safety-of-life applications. Additionally, it will not cause any interference to existing systems. Thus, with no modification of existing systems, the addition of the L5 signal will make GPS a more robust radionavigation service for many aviation applications, as well as for all ground-based users, like maritime, railways, surface, shipping, etc. The L5 signal will provide significant benefits above and beyond the capabilities of the current GPS constellation, even after the planned second activity frequency L2 becomes available. Benefits include precision approach navigation worldwide, increased availability of precision navigation operations in certain areas of the world, and interference mitigation. The new L5 signal will be available on GPS Block IIF satellites scheduled for launch beginning in 2005.

At the current GPS satellite replenishment rate, all three civil signals, i.e. L1-C/A, L2-C/A and L5, will be available for initial operational capability by 2010, and for full operational capability approximately by 2013.

In particular communication systems operating in the 1900 band, like GSM1900, which are widely referred to as PCS (Personal Communication System), and communication systems operating in the 1800 band, like GSM1800, which are widely referred to as DCS (Digital Communication System), will generate wideband noise in this GPS L1 band of 1575.42 MHz +/−5 MHz, when C/A code supported GPS is used. When new L2 and L5 frequency GPS signals are used, then lower frequency GSM signals, i.e. GSM900 and GSM800, will generate the same wide band noise problem as GSM1800 to the L1 GPS signal.

Measurements show that if no measures are taken, the SNR of a GPS signal received by a GPS receiver degrades by about 2 dB in case a GSM transmitter implemented in the same device uses for transmissions a single slot TX (transmission) mode, and by about 3 dB in case the GSM transceiver implemented in the same device uses for transmissions a dual slot TX mode.

The GPS receiver, however, requires a sufficient SNR of received satellite signals for being able to correctly acquire and track the signal based on its C/A-code and thus to make use of its content. It is better for the performance of the GPS receiver to receive signals with a particularly low SNR than not to receive any signal at all during short time intervals.

Typically in spread spectrum systems, the AGC (Automatic Gain Control) tunes the received information signal level for A/D (analog to digital) conversion based on the noise level. In normal operating conditions, the noise is coming from background noise, which has a constant power level. The problem arises when the noise level rises rapidly and the AGC tries to adjust an incoming signal to a certain appropriate level for an A/D conversion. A quickly varying high noise level can cause saturation in the A/D converter and the amplitude of the signal is clipped. Of the signal is clipped in conversion, some information signal is lost and thus the receiver performance is degraded.

Also external interferences can block a GPS receiver operation completely, in case multiple communication system transmitters are transmitting in the same area at the same time.

The same problem may further occur when a Galileo receiver is used instead of a GPS receiver. Galileo is a European satellite positioning system, for which the beginning of commercial operations is scheduled for 2008. Galileo comprises 30 satellites, which are distributed to three circular orbits to cover the entire surface of the Earth. The satellites will further be supported by a worldwide network of ground stations. It is planned that Galileo will provide ten navigation signals in Right Hand Circular Polarization (RHCP) in the frequency ranges 1164-1215 MHz, using carrier signals E5a and E5b, 1215-1300 MHz, using a carrier signal E6, and 1559-1592 MHz, using a carrier signal E2-L1-E1. Similarly as with GPS, the carrier frequencies E5a, E5b, E6 and E2-L1-E1 will be modulated by each satellite with several PRN codes spreading the spectrum and with data. Thus, GSM transmitters may equally generate wideband interferences in frequency bands employed by Galileo.

Obviously, the performance of a receiver due to transmissions by a communication system transmitter may equally be degraded in a similar situation in case of a type of a communication system transmitter other than a GSM transmitter and/or a type of a receiver other than a GPS receiver or a Galileo receiver.

In U.S. Pat. No. 6,107,960, a method is proposed for reducing cross-interferences in a combined satellite positioning system receiver and communication system transceiver device. A control signal is transmitted from the communication system transceiver to the satellite positioning system receiver, when the communication transceiver transmits data at a high power level over a communication link. The control signal causes the satellite positioning system signals from satellites to be blocked from the receiving circuits of the satellite positioning system receiver, or to be disregarded by the processing circuits of the satellite positioning system receiver.

For a communication system transmitter which is combined in a single device with the satellite positioning system receiver, it has further been proposed to improve the SNR of received satellite signals by adding an external notch-filter to the transmission path of the communication system transmitter. The notch filter, which is arranged after a power amplifier in the transmission path, has a passband frequency range for passing on the frequencies required for the communication system, and a stop band frequency range for attenuating the frequencies required for the satellite positioning system.

For PCS and DCS, the passband frequency range of the notch filter has to be 1710 MHz to 1910 MHz, and in case GPS is used as a satellite positioning system, the stop band frequency range has to be 1558.42 MHz to 1580.43 MHz. In order to improve the SNR of received GPS signals to a useful level, a very high attenuation is required for the stop band. Applying a high attenuation, however, increases also the insertion loss of the notch filter at the pass band of the filter. Due to this additional loss after the power amplifier, more output power has to be taken from the power amplifier, which increases the current consumption.

Measurements show that an antenna isolation of about 10 dB is required for single slot GSM, if the GPS SNR is to be improved to a desired level of 0.5 dB degradation. To a GSM1800 transmission path, a 30 dB external GPS band attenuator has to be added for achieving the same desired level of 0.5 dB degradation. For dual slot GSM, the required attenuation is even higher.

The insertion loss of a GPS notch-filter with a 30 dB GPS band attenuation will lie between 0.7 dB and 1.0 dB. An insertion loss between 0.7 dB and 1.0 dB increases the current consumption of the power amplifier by about 20%, compared to a current consumption without insertion loss.

It is thus a disadvantage of the approach using a notch-filter that an extra component is needed in the communication system transmitter and that the power amplifier current consumption increases about 20%, which also results in an increased heating of the device. On the whole, the costs for improving the GPS SNR by only about 1.5 dB are high.

SUMMARY OF THE INVENTION

It is an object of the invention to provide an alternative to existing solutions for improving the performance of a receiver in interfering conditions.

On the one hand, a device is proposed, which comprises a receiver for receiving and processing signals at least in a first frequency band, and at least a first antenna which is connected to the receiver. The proposed device further comprises a tuning component for shifting a frequency response of the first antenna from the first frequency band to a second frequency band. The tuning component may include for instance a capacitance diode, but equally or any other suitable components. Moreover, the proposed device comprises a controlling portion causing the tuning component to shift the frequency response of the antenna from the first frequency band to the second frequency band, in case a wideband noise is expected in the first frequency band.

On the other hand, am method for improving the performance of a receiver is proposed. The receiver is able to receive and process signals at least in a first frequency band, and it is connected to at least a first antenna. The proposed method comprises as a first step determining whether a wideband noise is expected in the first frequency band. The proposed method comprises as a second step shifting a frequency response of the first antenna from the first frequency band to a second frequency band, in case a wideband noise is determined to be expected in the first frequency band.

The invention proceeds form the consideration that some receivers, like GPS receivers, have severe problems in coping with high noise levels, it is therefore proposed that when wideband noise is generated in the frequency band employed for the signals which are to be received by the receiver, the antenna is detuned out of the regular center frequency. As a result, the wideband noise cannot be received any more via the antenna and does thus not disturb the receiver.

It is an advantage of the invention that it provides an alternative to existing solutions.

When detuning the antenna, also the received signal is attenuated. If the received signal is weak, the attenuation causes as a result that the signal cannot be detected. However, if the signal is strong, it may be possible to detect the signal in spite of the attenuation. This constitutes an advantage compared to the solution proposed in the above cited document U.S. Pat. No. 6,107,960, as here, the blocking or disregarding of satellite signals affects satellite signals of any strength.

It is further an advantage of the invention that it requires no additional components in a communication system transmitter of the device.

Preferred embodiments of the invention become apparent from the detailed description that follows below.

The invention can be employed in any device comprising a receiver. The receiver can be for example a satellite positioning system receiver like a GPS receiver or a Galileo receiver, but equally any other type of receiver.

The invention can be employed in particular, though not exclusively, in any device comprising a receiver and in addition a communication system transmitter. The communication system transmitter can be for example part of a GSM transceiver, of a US-TDMA transceiver, of a WCDMA-GSM transceiver or of a CDMA-transceiver.

In case the invention is employed in a device comprising in addition a communication system transmitter, it can be used in particular for attenuating wideband noise generated by this communication system transmitter in the first frequency band. Wideband noise in the first frequency band can then be expected by the controlling portion at least whenever the communication system transmitter is known to be transmitting signals. The controlling portion may either be part of the communication system transmitter or receive a corresponding information about transmissions from the communication system transmitter. It has to be noted, however, that the invention can equally be employed for attenuating wideband noise generated by a unit external to the device.

In an advantageous embodiment, the receiver comprises at least a first receiving chain for receiving and processing radio frequency signals in the first frequency band and a second receiving chain for receiving and processing radio frequency signals in the second frequency band. In this embodiment, the first antenna is connected to the first receiving chain and in addition via a switching component to the second receiving chain. The controlling portion can then cause the switching component to connect the first antenna in addition to the second receiving chain, whenever a wideband noise is expected in the first frequency band. Thereby, the performance of the receiver can be improved, as signals may be available for evaluation at the second frequency band while the signals at the first frequency band are being disturbed by wideband noise.

In case the receiver comprises two receiving chains, the device according to the invention comprises advantageously in addition a second antenna, which has a frequency response at the second frequency band and which is equally connected via the switching component to the second receiving chain. The second antenna can be used for a diversity reception improvement in the receiver. The controlling portion may then cause the switching component to disconnect the second antenna from the second receiving chain, whenever the first antenna is connected via the switching component to the second receiving chain since a wideband noise is expected in the first frequency band.

In such a device, the controlling portion advantageously further causes the switching component to connect the first antenna to the second receiving chain and to disconnect the second antenna from the second receiving chain, in case a wideband noise is expected in the second frequency band.

The noise in the second frequency band can be generated for example by a second communication system transmitter of the device, which transmits signals via a radio interface in a different frequency band than the first communication system transmitter of the device. In this case, wideband noise in the second frequency band can be expected by the controlling portion at least whenever the second communication system transmitter is known to be transmitting signals.

BRIEF DESCRIPTION OF THE FIGURES

Other objects and features of the present invention will become apparent from the following detailed description considered in conjunction with the accompanying drawing.

DETAILED DESCRIPTION OF THE INVENTION

Figure 2:
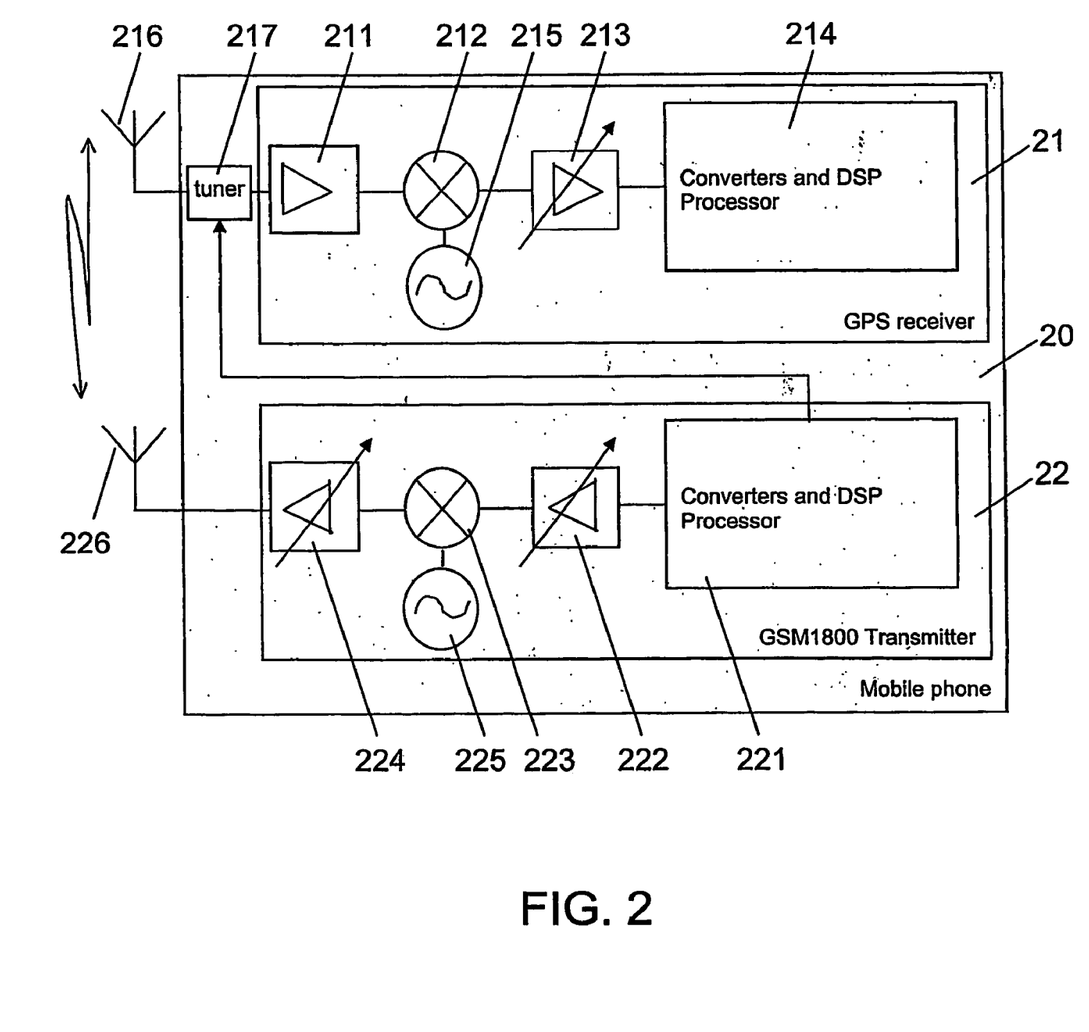
FIG. 2 is a schematic block diagram of a mobile phone, in which a first embodiment of the invention is implemented.

FIG. 2 is a schematic block diagram of a mobile phone 20, in which a first embodiment of the invention is implemented. Only selected components of the mobile phone 20 are depicted.

The mobile phone supports a GPS positioning and a mobile communication via a GSM network.

For supporting the GPS positioning, the mobile phone 20 comprises a GPS receiver 21. The GPS receiver 21 includes, connected to each other in series, a low noise amplifier LNA 211, a mixer 212, a variable gain attenuator 213 and a converters and DSP (digital signal processor) processor block 214. A local oscillator 215 is connected in addition to the mixer 212. The local oscillator 215 provides a signal having a frequency required for downconverting an L1 signal. The mobile phone 20 further comprises a GPS antenna 216 which is connected via a tuning component 217 to the low noise amplifier 211 of the GPS receiver 21. The tuning component 217 comprises a detuning circuitry, e.g. a capacitance diode, for tuning the frequency band which can be received via the GPS antenna 216.

For supporting the mobile communication, the mobile phone 20 comprises a GSM1800 transmitter 22, which is part of a GSM1800 transceiver. The transmitter 22 comprises, connected to each other in series, a converters and DSP processor block 221, a first variable power amplifier 222, a mixer 223 and a second variable power amplifier 224. The transmitter 22 further comprises a local oscillator 225, which is connected to the mixer 223. The mobile phone 20 moreover comprises a GSM antenna 226, which is connected to the second variable amplifier 224. The converters and DSP processor block 221 of the transmitter 22 has a controlling access to the tuning component 217.

A radio frequency signal reaching the mobile phone 20 is received by the GPS antenna 216, in case the signal lies within the frequency band of the frequency response of the GPS antenna 216. The tuning component 217 is able to switch the frequency response of the GPS antenna 216 between two different frequency bands, one of which is the GPS L1 frequency band. A radio frequency signal received via the GPS antenna 216 is processed by the GPS receiver 21. More specifically, the received signal is amplified by the LNA 211 and mixed by the mixer 212 with a signal provided by the local oscillator 215. In case the received signal is an L1 signal, the mixing results in a down-conversion to the base band. The downconverted signal is then attenuated or amplified by the variable gain attenuator 213 with a gain currently set by an AGC (automatic gain control), and finally processed in a conventional way in the converters and DSP processor block 214. The processing in the converters and DSP processor block 214 may comprise for instance determining and tracking a C/A-code in the signal, decoding a navigation information comprised in the tracked signal and performing positioning calculations for determining the current position of the mobile phone 20.

A signal, which is to be transmitted by the GSM transmitter 22 in the scope of a mobile communication to a base station, is processed for transmission in a conventional way by the GSM transmitter 22. The signal is provided by the converters and DSP processor block 221 to the first variable power amplifier 222, which amplifies the signal with a currently set amplification factor. The amplified signal is then mixed by the mixer 223 with a signal provided by the local oscillator 225 for an up-conversion to a radio frequency signal. The radio frequency signal is further amplified by the second variable power amplifier 224 with a currently set amplification factor. The amplification factors are set by an AGC according to a request by the base station of a communication network to which the mobile phone 20 is currently connected. The signal output by the second variable power amplifier 224 is then transmitted via the GSM antenna 226.

Figure 3:
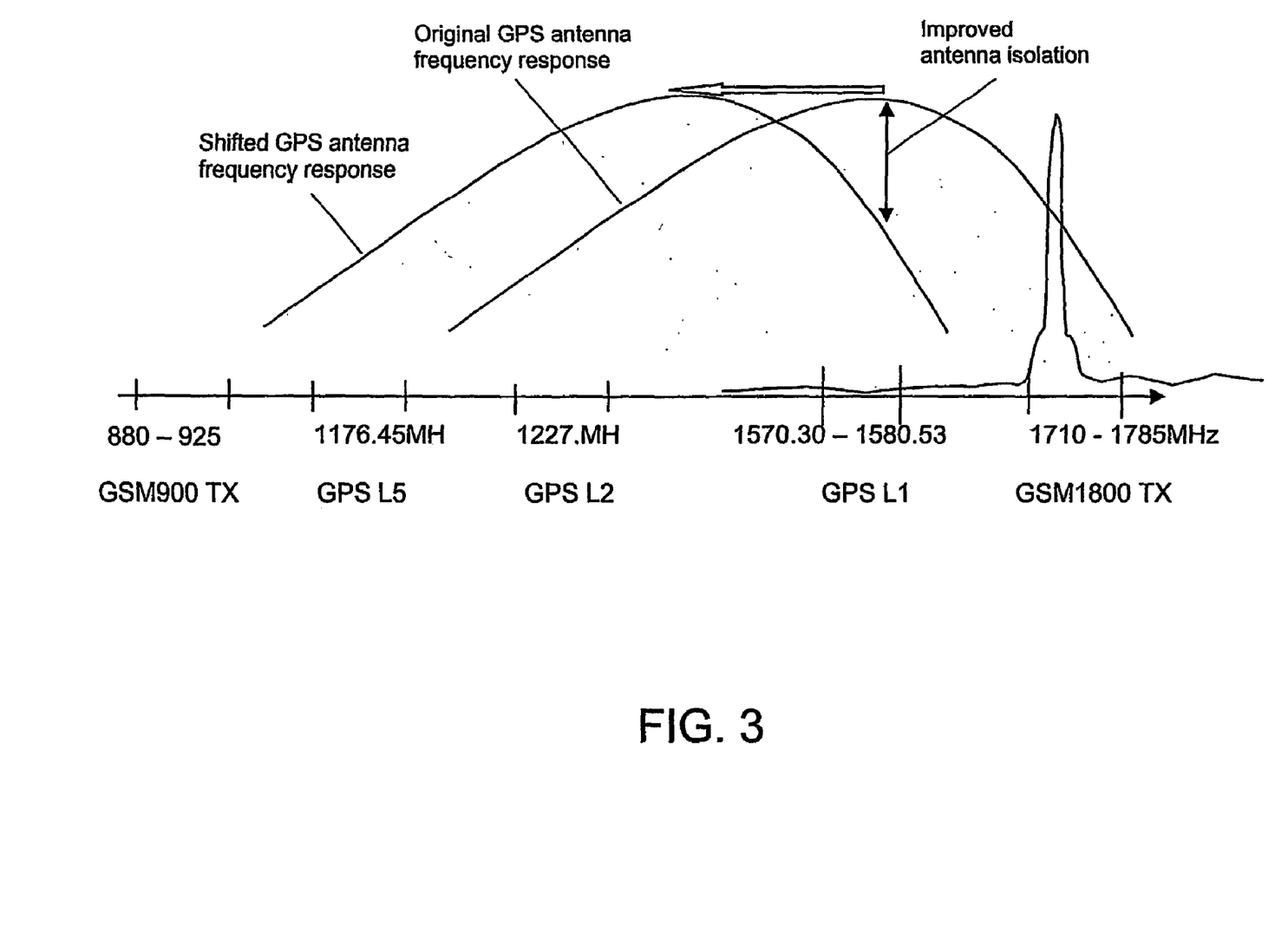
FIG. 3 is a diagram illustrating the operation of the first embodiment of the invention.

The detuning of the GPS antenna 216 to another frequency band by the tuning component 217 will be explained in more detail in the following with reference to FIG. 3. FIG. 3 is a diagram which depicts on a frequency line the GSM1800 TX band of 1710-1785 MHz, the GPS L1 band of 1570.30-1580.53 MHz, the GPS L2 band around 1227 MHz, the GPS L5 band around 1176.45 MHz and the GSM900 TX band of 880-925 MHz.

In a first state, the GSM transmitter 22 does not transmit any signals. In this first, basic state, the GPS antenna 216 is tuned by the tuning component 217 to receive satellite signals in the GPS L1 frequency band of 1570.30 MHz to 1580.53 MHz. The corresponding original GPS antenna frequency response is shown as a first curve in FIG. 3.

In a second state, the GSM transmitter 22 transmits signals having a carrier frequency in the range of 1710-1785 MHz, causing wideband noise in the GPS L1 frequency band of 1575.42 MHz +/−5 MHz. The distribution of the power level of transmitted GSM1800 signals over the frequency is depicted as second curve in FIG. 3. The generated wideband noise is superimposed on any satellite signal reaching the GSP antenna 216. The wideband noise degrades the performance of the GPS receiver 21, in case it reduces the SNR of received GSP L1 satellite signals below an acceptable value.

When the GSM transmitter 22 transmits signals with a power level exceeding a predetermined low power level, the converters and DSP processor block 221 of the GSM transmitter 22 therefore provides a control signal to the tuning component 217. Thereupon, the tuning component 217 detunes the GSP antenna 216 to somewhat lower or higher frequencies. The resulting shifted GPS antenna frequency response is depicted as third curve in FIG. 3 in the case the frequency is tuned to a lower frequency.

With the shifted GPS antenna frequency response, the antenna isolation between the GSM antenna 226 and the GPS antenna 216 is improved, as indicated by a double headed arrow in FIG. 3. When a GPS signal reaching the mobile phone 20 is strong, and has thus a rather high SNR in spite of the superimposed wideband noise, the signal received via the GSP antenna 216 may be strong enough for a detection even though the GPS antenna 216 is detuned. When a GPS signal reaching the mobile phone 20 is weak, however, and has thus a rather low SNR due to the superimposed generated wideband noise, the signal received via the GPS antenna 216 is not strong enough for a detection, and thus errors in the evaluation in the converters and DSP processor block 214 are prevented. Therefore, the increased isolation between the GSM antenna 226 and the GSP antenna 216 that is achieved by the control signal from the GSM transmitter 22 to the tuning component 217 eases the performance degradation of the GSP receiver 21.

It is also possible to relate the amount of detuning to the extent of the respective amplification applied by GSM transmitter 22 to signals which are to be transmitted.

A second and a third embodiment of the invention, which will be presented further below, take into account planned future development of GPS.

The second embodiment of the invention is based on the assumption that in addition to the C/A-code of the L1 signal, also the P-code of the L1 signal and the L2 signal including a C/A code and a P-code are taken into civil usage.

Figure 4:
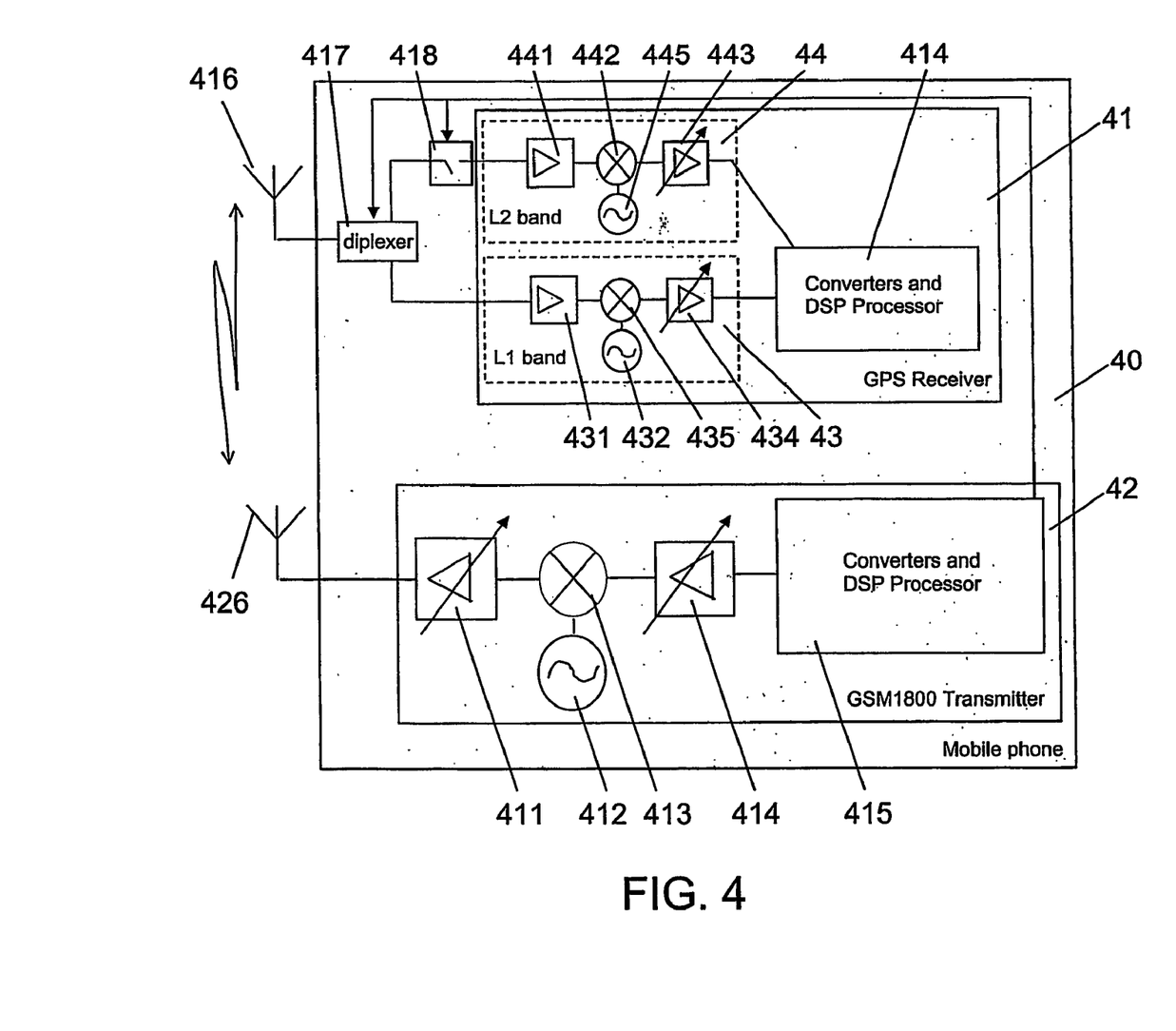
FIG. 4 is a schematic block diagram of a mobile phone, in which a second embodiment of the invention is implemented.

FIG. 4 is a schematic block diagram of a mobile phone 40, in which the second embodiment of the invention is implemented. As in FIG. 2, only selected components of the mobile phone 40 are depicted.

The mobile phone 40 of FIG. 4 supports again a GPS positioning and a mobile communication via a GSM network.

For supporting a GPS positioning, the mobile phone 40 of FIG. 4 comprises a GPS receiver 41. The GPS receiver 41 includes a first receiving chain 43 for receiving and processing L1 signals and a second receiving chain 44 for receiving and processing L2 signals. The L1 receiving chain 43 comprises, connected to each other in series, a first low noise amplifier LNA 431, a first mixer 435 and a first variable gain attenuator 434. The L1 receiving chain 43 further comprises a first local oscillator 432, which is connected to the first mixer 435. The first local oscillator 432 provides a signal having a frequency which is required for downconverting an L1 signal. The L2 receiving chain 44 comprises, connected to each other in series, a second low noise amplifier LNA 441, a second mixer 442 and a second variable gain attenuator 443. The L2 receiving chain 44 further comprises a second local oscillator 445, which is connected to the second mixer 442. The second local oscillator 445 provides a signal having a frequency which is required for downconverting an L2 signal. The GPS receiver 41 comprises in addition a converters and DSP processor block 414. The first variable gain attenuator 434 of the L1 receiving chain 43 and the second variable gain attenuator 443 of the L2 receiving chain 44 are both connected to this converters and DSP processor block 414.

For supporting a GPS positioning, the mobile phone 40 moreover comprises a GSP antenna 416. The GPS antenna 416 is connected by means of an enhanced diplexer 417 on the one hand to the first low noise amplifier 431 of the L1 receiving chain 43 and on the other hand via a switch 418 to the second low noise amplifier 441 of the L2 receiving chain 44. Typically, a diplexer combines two input path signals having different frequencies to one output path signal. The enhanced diplexer 417 comprises detuning circuitry and diplexer functionalities. The detuning function can be done with a capacitance diode or any other suitable component. The detuning circuitry tunes the frequency band, which can be received via the GPS antenna 416.

For supporting a mobile communication, the mobile phone 40 comprises a GSM1800 transmitter 42, which is part of a GSM1800 transceiver. The transmitter 42 comprises a converters and DSP processor block 415, a first variable power amplifier 414, a mixer 413 and a second variable power amplifier 411. The transmitter 42 further comprises a local oscillator 412 which is connected to the mixer 413. The mobile phone 40 further comprises a GSM antenna 426, which is connected to the second variable amplifier 411. The converters and DSP processor block 415 has in addition a controlling access to the diplexer 417 and the switch 418.

For supporting a mobile communication, the mobile phone 40 may comprise in addition a GSM900 transmitter (not shown), which is part of a GSM900 transceiver and designed similarly as the GSM1800 transmitter.

Transmissions via the GSM1800 transmitter and a GSM900 transmitter take place as described above with reference to FIG. 2 for the GSM1800 transmitter.

While the GSM1800 transmitter 42 is not transmitting any signals, the GSP antenna 416 is connected via the diplexer 417 only to the L1 ("first") receiver chain 43. The GSP antenna 416 is in resonance at the center frequency of the L1 frequency band, and received L1 signals are forwarded to the L1 receiver chain 43 and processed as described above with reference to FIG. 2.

When the GSM1800 transmitter 42 is transmitting signals, wideband noise is generated in the L1 frequency band. The converters and DSP processor block 415 therefore provides a control signal to the switch 418, which causes the switch 418 to be closed. As a result, signals received by the GSP antenna 416 are provided to both the L1 and the L2 ("second") receiving chain 43, 44,. At the same time, the converters and DSP processor block 415 provides a control signal to the diplexer 417, which causes the detuning circuitry in the diplexer 417 to detune the GPS antenna 416 to be in resonance at the center frequency of the L2 frequency band.

Figure 5:
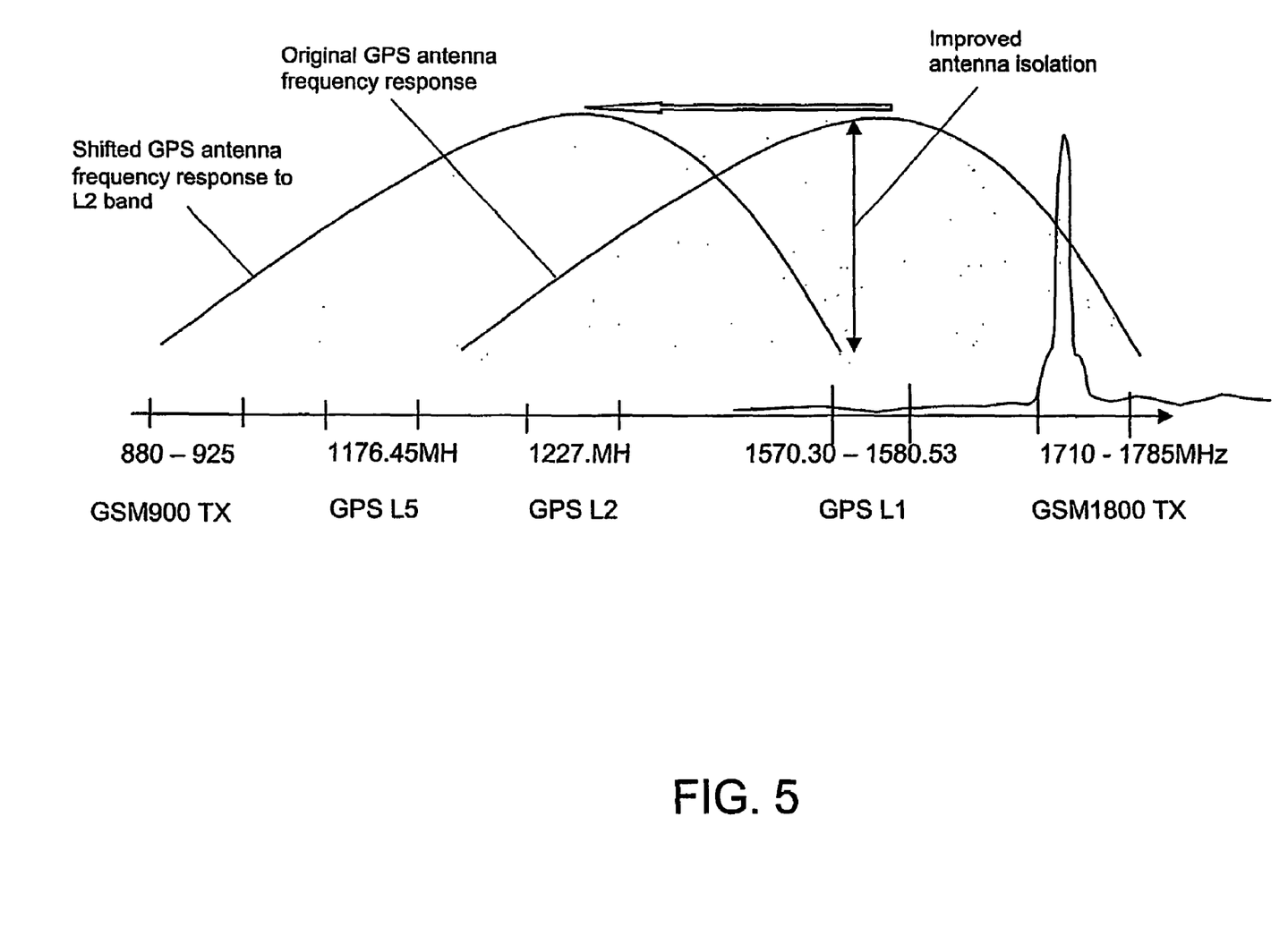
FIG. 5 is a diagram illustrating the operation of the second embodiment of the invention.

The shift of the GPS antenna frequency response is illustrated in FIG. 5. FIG. 5 is a diagram which corresponds to the diagram of FIG. 3, except that here, the GPS antenna frequency response was shifted exactly to the L2 frequency band. The resulting improvement of the isolation between the GSP antenna 416 and the GSM antenna 426 is advantageously rather high, as indicated by a double-headed arrow in FIG. 5.

Due to the specific detuning in the second embodiment of the invention, a good reception of the L2 frequency band by the GPS antenna 416 and thus a good reception of the L2 band C/A and P-code in the L2 receiving chain 44 is achieved. From the L1 band, the C/A-code and the P-code can still be received in some conditions via the L1 receiving chain 43, that is, if the L1 signal reaching the mobile phone is particularly strong. In case of a strong L1 carrier signal, also the SNR of the L1 signal will be sufficiently strong for an evaluation in spite of the wideband noise.

Figure 6:
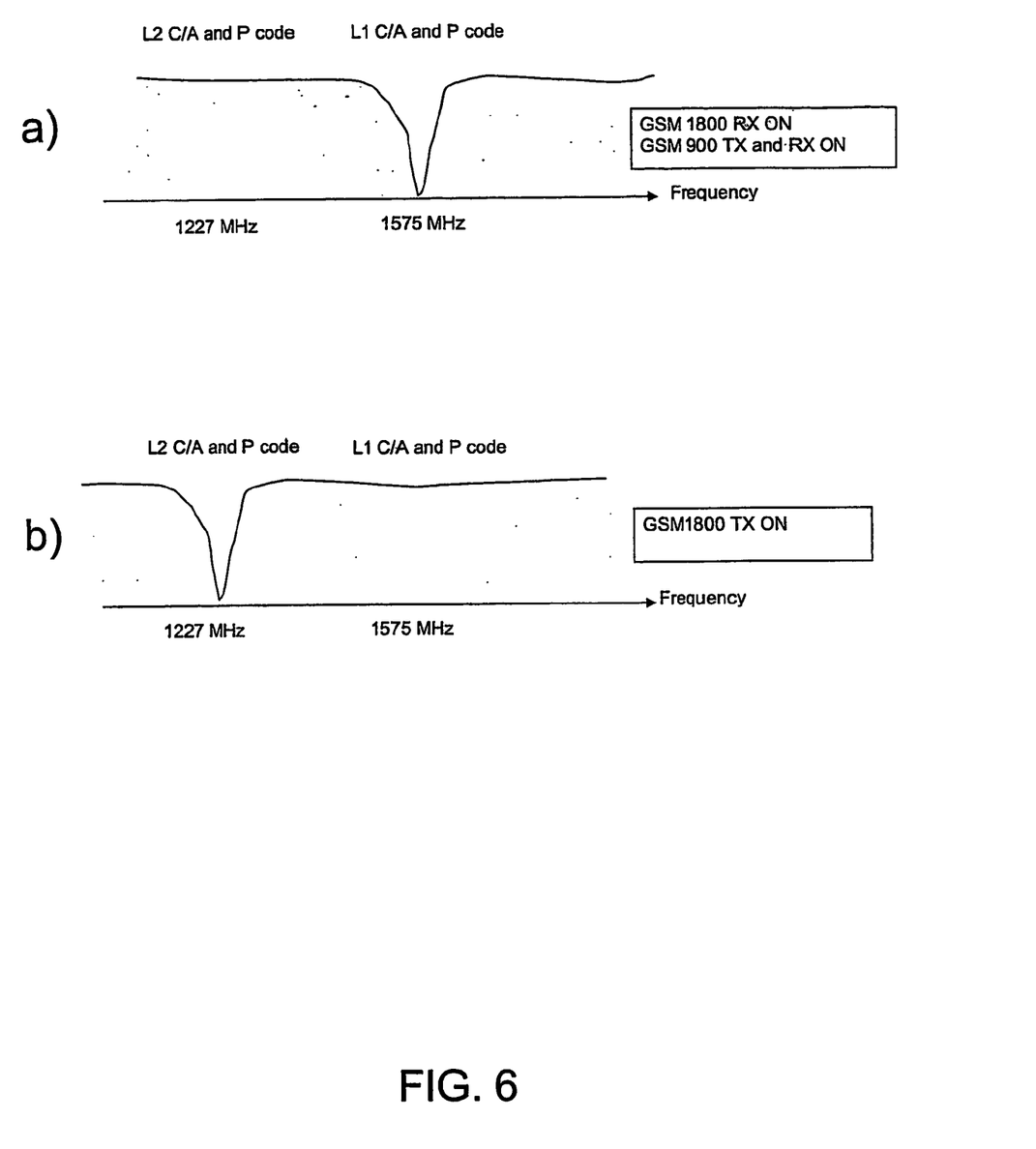
FIGS. 6a and 6b are further diagrams illustrating the operation of the second embodiment of the invention.

FIGS. 6a and 6b illustrate the detuning in another type of representation. In FIG. 6a, the insertion loss $S_{11}$ in dB of the GPS antenna 416 is depicted over the frequency for the case that there is no GSM1800 transmission. It can be seen that the insertion loss $S_{11}$ is in general at a basically constant, high value, but decreases to a minimum value at a center frequency of 1575 MHz with a transition range on both sides of this center frequency. This enables a good reception of the L1 band C/A-code and the L1 band P-code in the L1 receiver chain 43. The L2 receiver chain 44 is not in use. The GSM1800 transceiver may receive signals at the same time, and if the mobile phone 40 comprises in addition a GSM900 transceiver, the GSM900 transceiver may receive or transmit signals at the same time, as such operations do not generate any wideband noise in the L1 frequency band.

In FIG. 6b, the insertion loss $S_{11}$ in dB of the GPS antenna 416 is depicted over the frequency for the case that there is an ongoing GSM1800 transmission. It can be seen that the insertion loss $S_{11}$ is in general at a basically constant, high value, but decreases to a minimum value at a shifted center frequency of 1227 MHz with a transition range on both sides of this center frequency. This enable a good reception of the L2 band P-code in the L2 receiver chain 44. At the same time, the wideband noise generated by the GSM1800 transmission is attenuated.

The same result as for the European bands GSM1800 and GSM900 depicted in FIGS. 6a and 6b can be achieved for the U.S. bands GSM1900 and GSM850.

The third embodiment of the invention is based on the assumption that in addition to the C/A-code of the L1 signal, also the P-code of the L1 signal and of the L2 signal and a newly introduced C/A-code of the L2 signal are taken into civil usage.

Figure 7:
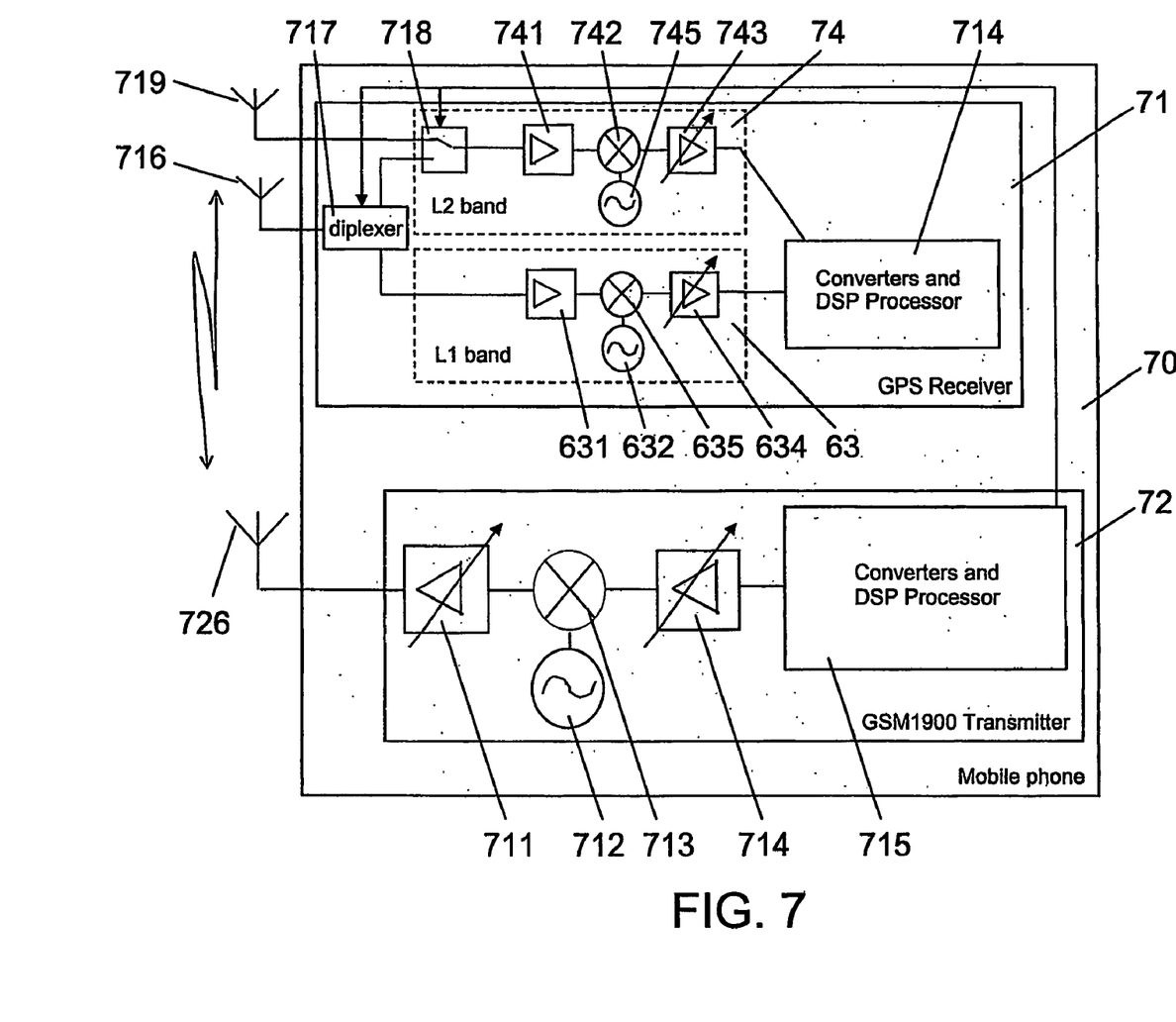
FIG. 7 is a schematic block diagram of a mobile phone, in which a third embodiment of the invention is implemented.

FIG. 7 is a schematic block diagram of a mobile phone 70, in which the third embodiment of the invention is implemented. As in FIGS. 2 and 4, only selected components of the mobile phone 70 are depicted.

The mobile phone 70 of FIG. 7 supports again a GPS positioning and a mobile communication via a GSM network. The C/A-code and the P-code of the L2 band are made use of in the GPS positioning for a diversity reception improvement.

The design of the mobile phone 70 of FIG. 7 is very similar to the design of the mobile phone of FIG. 4.

For supporting a GPS positioning, the mobile phone 70 of FIG. 7 thus comprises a GPS receiver 71. The GPS receiver 71 includes a first receiving chain 63 for receiving and processing L1 signals and a second receiving china 74 for receiving and processing L2 signals. The L1 receiving chain 63 comprises, connected to each other in series, a first low noise amplifier LNA 631, a first mixer 635 and a first variable gain attenuator 634. The L1 receiving chain 63 further comprises a first local oscillator 632, which is connected to the first mixer 635. The first local oscillator provides a signal having a frequency which is required for downconverting an L1 signal. The L2 receiving chain 74 comprises, connected to each other in series, a second low noise amplifier LNA 741, a second mixer 742 and a second variable gain attenuator 743. The L2 receiving chain 74 further comprises a second local oscillator 745, which is connected to the second mixer 742. The second local oscillator 745 provides a signal having a frequency which is required for downconverting an L2 signal. The GSP receiver 71 comprises in addition a converters and DSP processor block 714. The first variable gain attenuator 634 of the L1 receiving chain 63 and the second variable gain attenuator 743 of the L2 receiving chain 74 are both connected to this converters and DSP processor block 714.

For supporting GPS positioning, the mobile phone 70 moreover comprises a first GPS antenna 716 and a second GPS antenna 719. The first GPS antenna 716 is connected by means of an enhanced diplexer 717 on the one hand to the first low noise amplifier 631 of the L1 receiving chain 63 and on the other hand via a switch 718 to the second low noise amplifier 741 of the L2 receiving china 74. The enhanced diplexer 717 comprises a detuning circuitry for tuning the frequency band which can be received via the first GSP antenna 716 from the L1 frequency band to the L2 frequency band. The second GPS antenna 719 is connected equally via the switch 718 to the second low noise amplifier 741 of the L2 receiving chain 74. The second GPS antenna 719 is tuned in a fixed manner to the L2 frequency band. The switch 716 allows to connect either the first GPS antenna 716 or the second GPS antenna 719 to the second GPS receiving chain 74.

For supporting a mobile ocmmunicaiton, the mobile phone 70 comprises a GSM1900 transmitter 72, which is part of a GSM1900 transceiver. The transmitter 72 comprises a converters and DSP processor block 715, a first variable power amplifier 714, a mixer 713 and a second variable power amplifier 711. The transmitter 72 further comprises a local oscillator 712 which is connected to the mixer 713. The mobile phone 70 further comprises a GSM antenna 726, which is connected to the second variable amplifier 711. The converters and DSP processor block 715 has in addition a controlling access to the diplexer 717 and the switch 718.

For supporting a mobile communication, the mobile phone 70 comprises in addition a GSM850 transmitter (not shown), which is part of a GSM850 transceiver and designed similarly as the GSM1900 transmitter.

Transmissions via the GSM1900 transmitter 72 or the GSM850 transmitter are carried out as described above with reference to FIG. 2 for the GSM1800 transmitter 22, only in other frequency bands.

While neither the GSM1900 transmitter 72 nor the GSM850 transmitter is transmitting signals, the first GPS antenna 716 is connected via the diplexer 717 only to the first GPS receiver chain 63. At the same time, the second GPS antenna 719 is connected via the switch 718 to the second GPS receiver chain 74. The first GPS antenna 716 is in resonance at the L1 frequency band, and received L1 signals are forwarded to the first GPS receiver chain 63 and processed analogously as described above with reference to FIG. 2. The second GPS antenna 719 is in resonance at the L2 frequency band, and received L2 signals are forwarded to the second GPS receiver 74 chain and processed analogously as described above with reference to FIG. 2. The GSM1800 transceiver and the GSM900 transceiver may be receiving signals at the same time.

Figure 8:
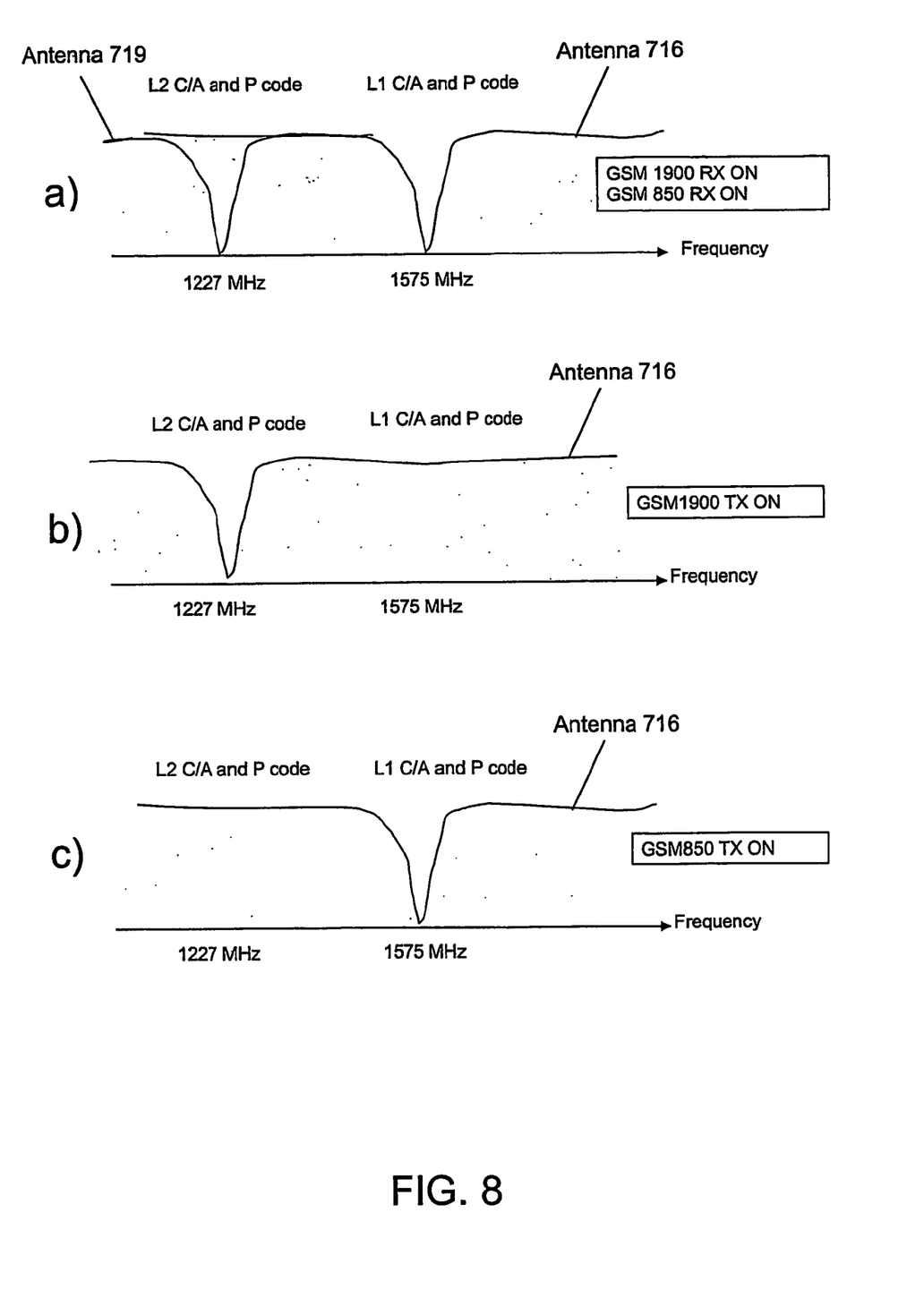
FIGS. 8a, 8b and 8c are diagrams illustrating the operation of the third embodiment of the invention.

This first situation is illustrated in FIG. 8a, in which the insertion loss $S_{11}$ in dB of both GPS antennas 716, 719 is depicted over the frequency for the case that there is no GSM transmission. At the first GPS antenna 716, the insertion loss $S_{11}$ is in general at a basically constant, high value, but decreases to a minimum value at a center frequency of 1575 MHz with a transition range on both sides of this center frequency. This enables a good reception of the L1 band C/A-code and P-code via the first GPS antenna 716 in the first GSP receiving chain 63. At the second GSP antenna 719, the insertion loss $S_{11}$ is in general at a basically constant, high value, but decreases to a minimum value at a center frequency of 1227 MHz with a transition range on both sides of this center frequency. This enables a good reception of the L2 band C/A-code and P-code via the second GPS antenna 719 in the second GPS receiving chain 74.

When the GSM1900 transmitter 72 is transmitting signals, wideband noise is generated in the L1 frequency band. The converters and DSP processor block 715 therefore provides a control signal to the switch 718, which causes the switch 718 to connect the diplexer 717 instead of the second GPS antenna 719 to the second GSP receiving chain 74. Thereby, signals received by the first GPS antenna 716 are provided to both, the first and the second GPS receiving chain 63, 74. The second GPS antenna 719 is now disconnected. At the same time, the converters and DSP processor block 715 causes the first GPS antenna 716 to be detuned to be in resonance at the L2 frequency band.

This second situation is illustrated in FIG. 8b, in which the insertion loss of the first GPS antenna 716 is depicted over the frequency for the case that there is a GSM1900 transmission. At the first GPS antenna 716, the insertion loss $S_{11}$ is in general at a basically constant, high value, but decreases to a minimum value at a shifted center frequency of 1227 MHz with a transition range on both sides of this center frequency. This enables a good reception of the L2 band C/A-code and P-code via the first GPS antenna 716 in the second GPS receiving chain 74. The wideband noise generated by the GSM1900 transmission is thus attenuated. From the L1 band, the C/A-code and the P-code can be received in some conditions via the first GPS antenna 716 in the first GPS receiving chain 63, that is, if the L1 satellite signal reaching the mobile phone 70 is particularly strong. The disconnected second GPS antenna 719 does not forward any signals.

When the GSM850 transmitter is transmitting signals, wideband noise is generated in the L2 frequency band. The converters and DSP processor block (not shown) of the GSM850 transmitter therefore provides a control signal to the switch 718, which causes the switch 718 to connect the diplexer 717 instead of the second GPS antenna 719 to the second GPS receiving chain 74. Thereby, signals received by the first GPS antenna 716 are provided to both, the first and the second GPS receiving chain 63, 74. The second GPS antenna 719 is now disconnected. The first antenna is kept to be tuned to be in resonance at the L1 frequency band.

This third situation is illustrated in FIG. 8c, in which the insertion loss $S_{11}$ of the first GPS antenna 716 is depicted over the frequency for the case that there is a GSM850 transmission. At the first GPS antenna 716, the insertion loss $S_{11}$ is in general at a basically constant, high value, but decreases to a minimum value at a center frequency of 1575 MHz with a transition range on both sides of this center frequency. This enables a good reception of the L1 band C/A-code and P-code via the first GPS antenna 716 in the second GPS receiving chain 74. The disconnected second GPS antenna 719 does not forward any signals. The wideband noise generated by the GSM850 transmission is thus attenuated. From the L2 band, the C/A-code and the P-code can be received in some conditions via the first GPS antenna 716 in the second GPS receiving chain 74, that is, if the L2 satellite signal reaching the mobile phone 70 is particularly strong.

It is to be understood that in the second and third embodiment, one of the GPS receiver chains or an additional GPS receiver chain could also be a receiver chain for receiving GPS signals at the L5 band, if suitable signals are transmitted at this band.

It is further to be noted that the described embodiments constitute only three of a variety of possible embodiments of the invention.

The invention claimed is:

1. Device comprising:
    a receiver comprising at least a first receiving chain configured to receive and process radio frequency signals in a first frequency band and a second receiving chain configured to receive and process radio frequency signals in a second frequency band;
    at least a first antenna which is connected in a fixed manner to said first receiving chain and which is in addition connectable via a switching component to said second receiving chain;
    a tuning component configured to shift a frequency response of said first antenna from said first frequency band to a second frequency band; and
    a controlling portion configured to cause said tuning component to shift said frequency response of said first antenna from said first frequency band to said second frequency band and causing said switching component to connect said first antenna in addition to said second receiving china, in case a wideband noise is expected in said first frequency band.

2. Device according to claim 1, further comprising a communication system transmitter configured to transmit signals via a radio interface, wherein a transmission of signals by said communication system transmitter causes wideband noise in said first frequency band, and wherein wideband noise in said first frequency band is expected by said controlling portion whenever said communication system transmitter is transmitting signals causing wideband noise in said first frequency band.

3. Device according to claim 1, further comprising a second antenna, which second antenna has a frequency response at said second frequency band and which second antenna is equally connected via said switching component to said second receiving china, wherein said controlling portion is configured to cause said switching component to disconnect said second antenna from said second receiving chain, in case a wideband noise is expected in said first frequency band.

4. Device according to claim 3, wherein said controlling portion is configured to cause said switching component to connect said first antenna to said second receiving chain and to disconnect said second antenna from said second receiving chain, in case a wideband noise is expected in said second frequency band.

5. Device according to claim 4, further comprising a communication system transmitter configured to transmit signals via a radio interface, wherein a transmission of signals by said communication system transmitter causes wideband noise in said second frequency band, and wherein wideband noise in said second frequency band is expected by said controlling portion whenever said communication system transmitter is transmitting signals causing wideband noise in said second frequency band.

6. Device according to claim 1, wherein said receiver is a satellite based position system receiver for receiving and processing signals transmitted by satellites of the satellite based positioning system.

7. Device according to claim 6, wherein said first frequency band is a Global Positioning System L1 band and wherein said second frequency band is one of a Global Positioning System L2 band and a Global Positioning System L5 band.

8. Method for improving the performance of a receiver of a device, which receiver comprises at least a first receiving chain for receiving and processing radio frequency signals in a first frequency band and a second receiving chain for receiving and processing radio frequency signals in a second frequency band, wherein at least a first antenna of the device is connected in a fixed manner to said first receiving chain and wherein said first antenna is in addition connectable via a switching component to said second receiving chain, said method comprising:
    determining whether a wideband noise is executed in said first frequency band; and
    shifting a frequency response of said first antenna from said first frequency band to a second frequency band and causing said switching component to connect said first antenna in addition to said second receiving chain, in case a wideband noise is determined to be expected in said first frequency band.

9. Method according to claim 8, wherein said receiver is comprised in a single device with a communication system transmitter, a transmission of signals by said communication system transmitter causing wideband noise in said first frequency band, and wherein determining whether a wideband noise is expected in said first frequency band comprises detecting whether said communication system transmitter is transmitting signals via a radio interface.

10. Method according to claim 8, wherein a second antenna is connected to said receiver, which second antenna has a frequency response at said second frequency band, said method further comprising preventing a processing of radio frequency signals received via said second antenna, in case a wideband noise is determined to be expected in said first frequency band.

11. Method according to claim 10, further comprising:
    determining whether a wideband noise is expected in said second frequency band;
    enabling radio frequency signals in said second frequency band received via said first antenna to be processed by said receiver, in case a wideband noise is determined to be expected in said second frequency band; and
    preventing a processing of radio frequency signals received via said second antenna by said receiver, in case a wideband noise is determined to be expected in said second frequency band.

12. Method according to claim 11, wherein said receiver is comprised in a single device with a communication system transmitter, wherein a transmission of signals by said communication system transmitter causes wideband noise in said second frequency band, and wherein determining whether a wideband noise is expected in said second frequency band comprises detecting whether said communication system transmitter is transmitting signals via a radio interface.

13. Method according to claim 8, wherein said receiver is a satellite based positioning system receiver for receiving and processing signals transmitted by satellites of the satellite based positioning system.

14. Method according to claim 13, wherein said first frequency band is a Global Positioning System L1 band and wherein said second frequency band is one of a Global Positioning System L2 band and a Global Positioning System L5 band.

15. Mobile telephone with global positioning system receiver capability, comprising:
 a receiver having an antenna for receiving and a processor for processing global positioning system signals received at least in a first frequency band;
 a tuning component responsive to a control signal for shifting a frequency response of said antenna from said first frequency band to a second frequency band; and
 a control responsive to operation of said telephone acting as a radio transmitter for providing said control signal.

16. Apparatus comprising:
 means for determining whether a wideband noise is expected in a first frequency band; and
 means for shifting a frequency response of a first antenna from said first frequency band to a second frequency band and causing a switching component to connect a first antenna to a second receiving chain of a receiver, in case a wideband noise is determined to be expected in said first frequency band, wherein said apparatus is for improving the performance of a receiver of a device, which receiver comprises at least a first receiving chain for receiving and processing radio frequency signals in said first frequency band and a second receiving chain for receiving and processing radio frequency signals in said second frequency band, wherein said first antenna is connected in a fixed manner to said first receiving chain and wherein said fist antenna is connectable in addition via said switching component to said second receiving chain.

17. Device according to claim 1, wherein said device is a mobile phone.

18. Apparatus comprising a controlling portion,
 said controlling portion being configured to determine whether a wideband noise is expected in a first frequency band;
 said controlling portion being configured to cause a tuning component to shift a frequency response of a first antenna from a first frequency band to a second frequency band in case a wideband noise is determined to be expected in said first frequency band, said first antenna being connected in a fixed manner to a first receiving chain for receiving and processing radio frequency signals in a first frequency band and said first antenna being connectable in addition via a switching component to a second receiving chain for receiving and processing radio frequency signals in a second frequency band; and
 said controlling portion being configured to cause said switching component to connect said first antenna in addition to said second receiving chain in case a wideband noise is determined to be expected in said first frequency band.

19. Apparatus according to claim 18, wherein said controlling portion is configured to expect wideband noise in said first frequency band whenever a communication system transmitter is transmitting signals via a radio interface causing wideband noise in said first frequency band.

20. Apparatus according to claim 18, wherein said controlling portion is configured to cause said switching component to disconnect a second antenna having a frequency response at said second frequency band from said second receiving chain, in case a wideband noise is expected in said first frequency band.

21. Apparatus according to claim 20, wherein said controlling portion is configured to cause said switching component to connect said first antenna to said second receiving chain and to disconnect said second antenna from said second receiving chain, in case a wideband noise is expected in said second frequency band.

22. Apparatus according to claim 21, wherein said controlling portion is configured to expect wideband noise in said second frequency band whenever a communication system transmitter is transmitting signals via a radio interface causing wideband noise in said second frequency band.

* * * * *

UNITED STATES PATENT AND TRADEMARK OFFICE
CERTIFICATE OF CORRECTION

| | | |
|---|---|---|
| PATENT NO. | : 7,525,481 B2 | Page 1 of 1 |
| APPLICATION NO. | : 10/559918 | |
| DATED | : April 28, 2009 | |
| INVENTOR(S) | : Marko Leinonen et al. | |

It is certified that error appears in the above-identified patent and that said Letters Patent is hereby corrected as shown below:

In column 13, line 41, claim 1, line 19, "china" should be --chain--.

In column 13, line 56, claim 3, line 5, "china" should be --chain--.

In column 14, line 26, claim 8, line 11, "executed" should be --expected--.

In column 15, line 41, claim 16, line 17, "fist" should be --first--.

Signed and Sealed this

Third Day of November, 2009

David J. Kappos
*Director of the United States Patent and Trademark Office*